United States Patent [19]

Meijer et al.

[11] Patent Number: 5,322,750

[45] Date of Patent: Jun. 21, 1994

[54] OPTICAL RECORDING MEDIUM

[75] Inventors: Egbert W. Meijer, Waalre; Bernard L. Feringa, Paterswolde; Wolter F. Jager; Ben De Lange, both of Groningen, all of Netherlands

[73] Assignee: U.S. Philips Corporation, New York, N.Y.

[21] Appl. No.: 690,734

[22] Filed: Apr. 24, 1991

[30] Foreign Application Priority Data

Apr. 24, 1990 [NL] Netherlands ................. 9000971

[51] Int. Cl.$^5$ ............................................. G11B 7/24
[52] U.S. Cl. ....................... 430/19; 430/495; 430/945; 430/342; 430/343; 346/135.1
[58] Field of Search ............... 430/495, 343, 945, 19, 430/342; 369/275.2; 346/135.1

[56] References Cited

U.S. PATENT DOCUMENTS

| | | | |
|---|---|---|---|
| 3,917,481 | 11/1975 | Saeva et al. | 430/31 |
| 4,551,819 | 11/1985 | Michl et al. | 365/120 |
| 4,753,861 | 1/1988 | Tsou et al. | 430/19 |
| 4,958,087 | 9/1990 | Meijer et al. | 359/328 |
| 5,011,756 | 4/1991 | Nikles | 430/19 |
| 5,023,859 | 6/1991 | Eich et al. | 365/113 |

FOREIGN PATENT DOCUMENTS 0312339 12/1988 European Pat. Off. .

OTHER PUBLICATIONS

J. Am. Chem. So, 99, pp. 602–603 (Jan. 1977) B. Feringa et al.

Rec. Trav. Chim. Pays-Bas, 97, 249–252 (Oct. 1978) Feringa et al.

*Primary Examiner*—Charles L. Bowers, Jr.
*Assistant Examiner*—John A. McPherson
*Attorney, Agent, or Firm*—Ernestine C. Bartlett

[57] ABSTRACT

An optical recording medium and a method of writing, reading and erasing information in an optical recording medium are provided in which the optical recording medium comprises a carrier and a recording layer which contains at least one optically active organic compound, wherein said optically active organic compound is an inherently chiral dissymmetric olefinic chromophore.

11 Claims, 1 Drawing Sheet

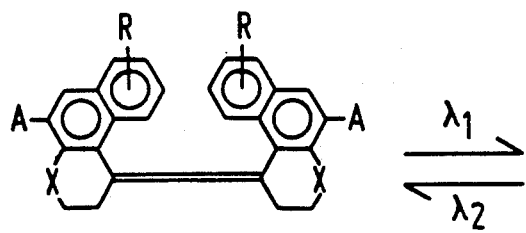
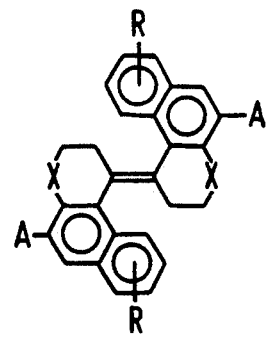
FIG.1a      FIG.1b
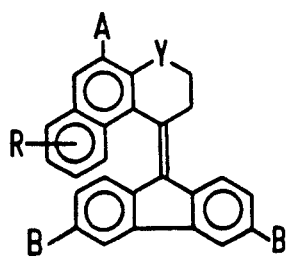
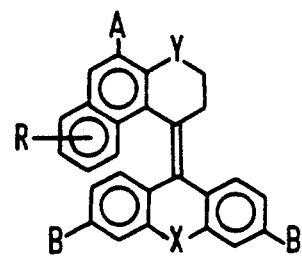
FIG.2       FIG.3
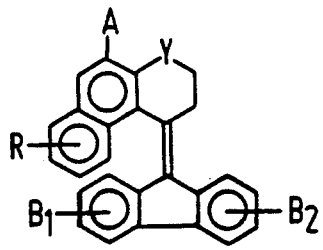
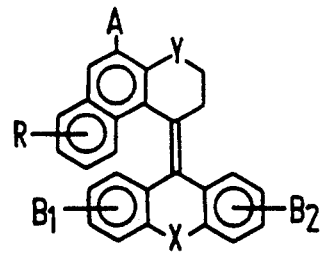
FIG.4       FIG.5
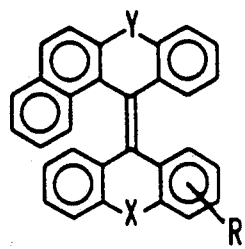
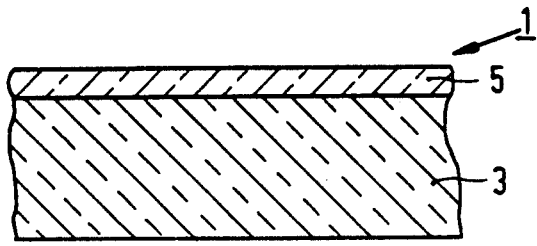
FIG.6       FIG.7

OPTICAL RECORDING MEDIUM

FIELD OF THE INVENTION

The invention relates to an optical recording medium comprising a carrier and a recording layer which contains at least one optically active organic compound.

The invention also relates to a method of writing, reading and erasing information in such an optical recording medium.

The invention further relates to optically active organic compounds which are suitable for use in such an optical recording medium.

BACKGROUND OF THE INVENTION

The optical recording media in question are suitable for writing and reading audio information, video images and data. Said recording media are mostly disc-shaped and the writing and reading of information takes place during rotation of the medium by a light beam emanating from a laser. The projection of the modulated laser beam on the recording medium brings about a change of the optical properties of said medium during the writing operation, which change can be optically detected later on during reading. Known media are those which are based on the magneto-optical or Kerr-effect and the "phase-change" mechanism. Further known media include those which contain photochromic compounds, in which the color of the compounds changes upon exposure to light of a specific wavelength. Detection of the change in color takes place by using light of a different wavelength.

An optical recording medium of the type mentioned in the opening paragraph is described in European Patent Application EP-A 312339. The medium described therein contains optically active compounds comprising an asymmetric carbon atom and hydrophobic and hydrophilic groups. Exposure to light of a wavelength of 360 nm causes the aggregation structure of said compounds to change, as a result of which a change takes place in the optical rotation. Said change in optical rotation is detected with linearly polarized light having a wavelength of 700 nm. The recorded information is erased with light having a wavelength of 560 nm, as a result of which the optical rotation returns to the original state. Erasing can also be carried out by a combined operation of irradiating the medium with light having a wavelength of 360 nm and heating it to 100° C. Of essential importance is the use of three wavelengths or two wavelengths in combination with a heating step for the write, read and erase processes, because the information must not be erased during reading. As a result of this requirement, use of the known medium is rendered complicated.

SUMMARY OF THE INVENTION

An object of the invention is to provide, inter alia, an optical recording medium in which the above-mentioned disadvantage is overcome. A further object of the invention is to provide a method in which the reading and erasing of information is based on a new principle.

According to the invention, this object is achieved by an optical recording medium comprising a carrier and a recording layer which contains at least one optically active organic compound, which recording medium is characterized in that the optically active organic compound is an inherently dissymmetric olefinic chromophore. Such a compound contains no asymmetric carbon atom, but obtains its optical activity through the fact that the compound itself is chiral, i.e. there are two mirror-image isomers or enantiomers of this compound. Both enantiomers rotate the plane of polarization of linearly polarized light in a counterclockwise or clockwise direction and are termed l- or d-form, respectively. Such a compound without an asymmetric carbon atom is defined as being inherently dissymmetric. The term olefinic indicates that the compound comprises at least one double bond. The term indicates that the chromophore compound absorbs light of a specific wavelength or a specific wavelength range. The chirality of these compounds is the result of a "twist" in the molecules brought about by the presence of an olefinic $\pi$-bond. As a result of said "twist", these compounds have a helical dissymmetry.

The compound consists of two stable enantiomers, one of which is the l-form and the other the d-form. During the writing of information, said enantiomers can at least partly be converted into one another (isomerized) by photochemical switching, i.e. by exposure to left-handed or right-handed circularly polarized light. By virtue of said photochemical switching between the d- and l-enantiomers, a rotation of the plane of polarization of linearly light is obtained, which effect can be used to read the recorded information. The recorded information is erased by circularly polarized light the direction of rotation of which is opposite to that used for writing, or by sufficiently powerful linearly polarized light. "Direct overwrite" of information which has already been recorded, i.e. without a separate erasing step, is also possible. The switching between the d- and l-form is reversible (writing and erasing, respectively) and can be repeated many times. The advantage of an optical recording medium according to this embodiment of the invention is that the operations of writing, reading and erasing information can all be carried out at the same wavelength and, hence, only one type of laser light source is required. Only the polarization state of the light used is varied, which can be realized in a simple manner, for example, by providing a $\lambda/4$-plate in the light path or removing said plate. The chiral compounds exhibit great chiroptic effects, i.e. they have high molar rotations [$\phi$] and ellipticities [0]. This means that a small concentration of these chiral compounds in a record layer yields a useful optical recording medium.

Starting from a racemic mixture, i.e. 50 mol % of l-enantiomer and 50 mol. % of d-enantiomer, an excess of, for example, 1% of one of the enantiomers is formed during writing with circularly polarized light. During erasing, the racemic mixture is formed again. By virtue of the great chiroptic effects of said chiral compounds, such small changes in the relative concentrations can be readily and accurately detected. Starting from pure l-enantiomer, a mixture of, for example, 49.5 mol % l-enantiomer and 50.5 mol % d-enantiomer is formed by the writing with circularly polarized light. Starting from pure d-enantiomer, a mixture of, for example, 50.5 mol % l-enantiomer and 49.5 mol % d-enantiomer is obtained by writing with circularly polarized light having a direction of rotation which is opposite to that mentioned above.

An example of an inherently dissymmetric olefinic chromophore which is suitable for an optical recording medium according to the invention is formed by the class of fluorenes, a representative of which is shown in FIG. 2. In said formula, Y represents a O- or S-atom or a NH- or N-alkyl- or SO- or a CH$_2$- or SO$_2$-group, A represents hydrogen or an alkoxy group, R represents Hydrogen or an alkyl group and B represents hydrogen or an alkyl or alkoxy group. R and A can also occupy other substitution positions and may be present at the benzene ring more than once or they may be present at different benzene rings. Both B-substituents are identical and can also take up other substitution positions, such that the "lower half" of the molecule is symmetrical. A suitable alkyl group is the methyl group; a suitable alkoxy group is the methoxy group. In this connection, it is noted that the aromatic groups of the "upper half" and "lower half" of the molecules are not both situated in the plane of the drawing because of the "twist" in the molecule. During the photochemical switching with left-handed or right-handed circularly polarized light, the aromatic groups move away from each other and through the plane of the drawing, so that, for example, the 1-form is isomerized into the d-form. The conversion of the 1-form into the d-form is reversible.

Another suitable compound for an optical recording medium according to the invention is a (thio)xanthone as shown in FIG. 3. In said Figure, X represents a S- or O-atom or a NH- or N-alkyl- or SO- or a SO$_2$-group and Y, A, R and B have the above mentioned meaning.

When the substituents B of the compounds shown in FIGS. 2 and 3 differ from each other or take up different substitution positions, compounds as shown in FIGS. 4 and 5 are formed. In said compounds, B1≠B2 and B1 and B2 represent a hydrogen or alkyl- or alkoxy groups. A suitable alkyl group is the methyl group; a suitable alkoxy group is the methoxy group. X, Y, A and R have the above-mentioned meaning. In such compounds, the "lower half" is non-symmetrical, as a result of which cis-isomers and trans-isomers exist in addition to 1- and d-enantiomers. Exposure to light of a first wavelength λ1 causes the cis-isomer to be partially converted into one (i.e. 1- or d-) of trans-isomers. Said conversion can be detected by the rotation of the plane of polarization of linearly polarized light. Since the cis- and trans-isomers have a different absorption maximum, the trans-isomer can be converted into the original cis-isomer by means of a second wavelength λ2. In this embodiment, an inscribable and erasable optical recording medium is obtained by using two wavelengths and without carrying out an additional heating step.

A suitable embodiment of an optical recording medium according to the invention is characterized in that the recording layer comprises a racemic cis-mixture or a racemic trans-mixture of a compound as shown in FIGS. 4 or 5. When, for example, a racemic cis-mixture is exposed to circularly polarized light of a first wavelength, a trans-mixture with an 1% excess of 1-enantiomer is formed, i.e. approximately 50.5 mol % of trans-1-enantiomer and 49.5 mol % of trans-d-enantiomer. This is called an enriched trans-mixture. This small excess of trans-1-enantiomer can be detected with linearly polarized light. The recorded information is erased by unpolarized light of a second wavelength, which second wavelength coincides with the absorption maximum of the trans-mixture. Starting from an enriched cis-mixture an analogous mechanism applies.

Another suitable compound for an optical recording medium according to the invention, which compound may be subject to a cis-transisomerisation, is shown in FIG. 1a. In said Figure, A, X and R have the above meaning. The corresponding trans-isomer is shown in FIG. 1b. Said compounds belong to the class of bis-phenanthrenes, a representative of which is described in an article by B. Feringa et al., in J. Am. Chem. Soc., 99, 602–603 (1977).

A racemic cis- or trans-mixture of a compound as shown in FIGS. 1, 4 or 5, can be prepared by mixing such a compound with a suitable, light-absorbing dye which heats up upon exposure to light. A racemic cis-mixture is formed from the cis-compound; a racemic trans-mixture is formed from the trans-compound.

A further suitable embodiment of an optical recording medium according to the invention is characterized in that the recording layer comprises a compound as shown in FIG. 6. In said Figure, X and Y have the above-mentioned meaning and R is hydrogen, an alkyl or alkoxy group. When R is hydrogen, the "lower half" of the molecule is symmetrical and only 1-d isomerization takes place.

For the sake of simplicity, the compounds shown in FIGS. 1, 2, 3, 4, 5 and 6 are drawn as if they extend in a flat plane. In reality, however, said compounds have a "twist" in the olefinic π-bond.

The substituents have an influence on the wavelength at which said photo-isomerization takes place. To shift the absorption maxima of said compounds towards longer wavelengths, use can be made of suitable combinations of electron-donating and electron-attracting groups, the so-called donor and acceptor substituents. Absorption maxima at longer wavelengths have the advantage that solid state diode lasers emitting in the wavelength range of 770–840 nm or about 670 nm can be used. Another much used wavelength is 633 nm, i.e. the HeNe laser wavelength. The donor and acceptor substituents may be located on different sides of the double bond. They may alternatively be located on the same side of the double bond. Examples of donor substituents are NH$_2$, N(CH$_3$)$_2$, OCH, SCH$_3$ and all the other donor substituents which are known to those skilled in the art. Examples of suitable acceptor substituents are NO$_2$, N$_2$+, SO$_2$CH$_3$, CN, 1,2,2 tricyano ethylene, 2,2 dicyano ethylene and all the acceptor substituents which are known to those skilled in the art.

Such a substituent can also act as a barrier against thermal racemization of an inscribed enantiomer mixture. In the case of thermal racemization the aromate groups of the optically active compounds move past each other and through the plane of the drawing. Other substituents can provide a better bonding to a polymer matrix of the record layer in which the optically active compounds are dissolved or dispersed. Suitable substituents are, for example, the hydroxy group or an acid group when polymethyl (meth)acrylate is used as the matrix. The recording layer consisting of a polymer matrix in which the optically active compounds are dissolved or dispersed can be provided on a suitable carrier by means of known methods, such as spin coating. By providing the optically active compounds with (meth)acrylate substituents, whether or not via spacer groups such as -(CH$_2$)$_n$- and -(CH$_2$CH$_2$O)$_n$-, the compounds can be co-polymerized with the polymer (meth)acrylate matrix. In this manner, the concentration of optically active compounds can be increased because the degree of solubility of such compounds in PMMA (polymethyl methacrylates) is generally low.

The polymer matrix may alternatively be composed of other polymers, such as polystyrene and diethylene glycol bisallyl carbonate (available commercially as CR-39).

A glass plate can be used as the carrier, but it is alternatively possible to use quartz and transparent synthetic resin substrates, such as polycarbonate, polystyrene, PMMA and CR-39.

The optically active compounds can also be provided on the carrier without a matrix by means of known techniques, such as spin coating.

A light-absorbing dye which heats up upon exposure may additionally be added to the optically active compounds to enhance the racemization of one of the enantiomers. The dye may alternatively be provided in a separate layer between the carrier and the record layer. Suitable dyes can be selected from the group which includes squarylium, methine, pyrylium, cyanine and naphthaquinone.

It is obvious that instead of one polymer layer also two or more polymer layers can be applied to the carrier, each layer comprising said optically active compounds, such that each layer comprises compounds which are sensitive to a different wavelength(range). In this manner, multilayer "recording" can take place, which results in an increased information density of the recording medium.

The object of providing a method of writing, reading and erasing information, according to a new principle, in an optical recording medium according to the invention, is achieved by a method which is characterized in that a racemic mixture of the inherently dissymmetric olefinic chromophore is used, which mixture is enriched with a l- or d-enantiomer during the writing of information with circularly polarized light, and linearly polarization light is used for reading, the rotation of the plane of polarization of the linearly polarized light being detected and linearly or circularly polarized light having a direction of rotation which is opposite to that used for writing being used for erasing. As described above, in principle, i.e. so long as no cis-trans isomerisation occurs, the writing, reading and erasing of information can be carried out at the same wavelength; only the polarization state of the light used has to be varied. As mentioned above, already at a low concentration, said inherently dissymmetric olefinic chromophores exhibit sufficiently great chiroptic effects to detect a readable signal.

A further embodiment of the method according to the invention is characterized in that during the writing of information with circularly polarized light, an enantiomer of the inherently dissymmetric olefinic chromophore is converted into a non-racemic mixture, i.e. a mixture comprising an excess of one of the two enantiomers (either l- or d-), in which embodiment linearly polarized light is used during reading, the rotation of the plane of polarization of the linearly polarized light being detected and linearly or circularly polarized light having a direction of rotation which is opposite to that used for writing being used for erasing.

Starting from a racemic mixture, i.e. 50 mol % of l-enantiomer and 50 mol % of d-enantiomer, an excess of one of the enantiomers, for example 50.5 mol % of l-enantiomer and 49.5 mol % of d-enantiomer, may be formed during the writing with circularly polarized light. By virtue of the great chiroptic effects of said compounds, the excess can be detected by means of the rotation of the plane of polarization of linearly polarized light. During erasing a racemic mixture is formed and inscribing can be resumed. This process can be repeated many times.

The above methods can be carried out with chiral compounds as shown in FIGS. 2 and 3. By virtue of the symmetry of the "lower half" of these compounds, the cis-trans isomerization is equivalent to l-d isomerization.

Another embodiment of the method according to the invention is characterized in that during the writing of information with light of a first wavelength, the inherently dissymmetric olefinic chromophore is subject to a cis-trans-isomerization, and linearly polarized light is used for reading, the rotation of the plane of polarization of the linearly polarized light being detected and light of a second wavelength being used for erasing, the chromophore being subject to a trans-cis-isomerization. A cis-compound as shown in FIGS. 1a, 4, 5 and 6 can be converted into the corresponding trans-compound by exposure to light. (See for example, FIG. 1b). This cis-trans-isomerization does not require polarized light. The cis- and trans-compounds have a different spectral absorption maximum, thus permitting the trans-compound to be reconverted into the corresponding cis-compound with light of a different wavelength. This principle enables a write and erase process. Since the cis- and trans-isomers have a different molar rotation, the reading operation can be carried out with linearly polarised light. In this embodiment, two wavelengths of the light used are necessary, however, an additional heating step during erasing is not required. In this method, the reading of information can alternatively take place by measuring the absorption of light, because the cis- and trans-isomers have a different spectral absorption maximum.

In the above-described methods, it is possible to erase the information which has been inscribed. In a number of applications this is not necessary or even undesirable. An alternative method is characterized in that an enantiomer of the inherently dissymmetric olefinic chromophore is racemized by means of light during the writing of information, and linearly polarized light is used for reading, the rotation of the plane of polarization of the linearly polarized light being detected. Starting from a l- or d-enantiomer, a racemic mixture is obtained during writing. When this mixture cannot readily be enriched with one of the enantiomers, a non-erasable optical recording medium is obtained. Whether enriching is possible or not depends on, inter alia, the type of substituent of the optically active compound. This method can be carried out using chiral compounds as shown in FIGS. 2 and 3, l-d isomerisation taking place in said method.

A further embodiment of the method according to the invention is characterized in that the recording medium comprises a dye having an absorption maximum which corresponds to the wavelength of the light to be used, an enantiomer of the inherently dissymmetric olefinic chromophore being racemized by means of said light during the writing of information, and linearly polarized light being used for reading. The light-absorbing dye may be contained in a separate layer or in the recording layer. The dye can be selected from the above-mentioned group of dyes. Exposure to light brings about a generation of heat as a result of which thermal racemization takes place. This method can be carried out with compounds as shown in FIGS. 1, 4, 5 and 6. The absorption maximum of the dye can be selected such that at said wavelength no cis-trans-isomerization takes place.

The invention also relates to novel compounds which are suitable for use in an optical recording medium and method according to the invention. These compounds are shown in FIGS. 2, 3, 4, 5 and 6, where X, Y, A, R, B, B1 and B2 have the above-mentioned meaning. More specifically, compounds preferred for use herein are inherently dissymmetric olefinic chromophores having the formula

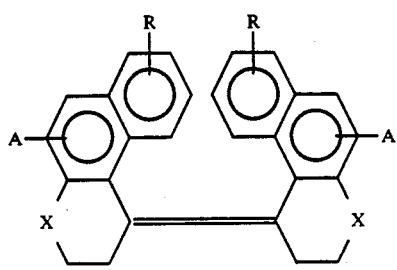
(I)

and/or inherently dissymmetric olefinic chromophores selected from the group of compounds including l- and d- eantiomers, isomers and mixtures thereof having the general formula:

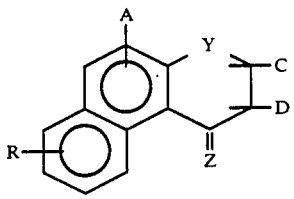
(II)

wherein:
Z is selected from

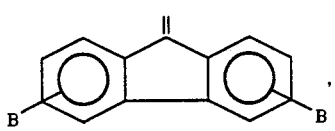,

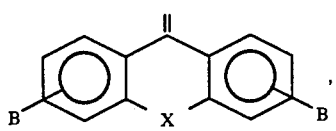,

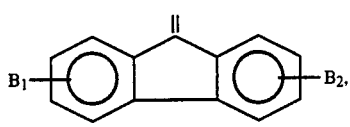,

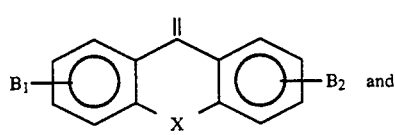 and

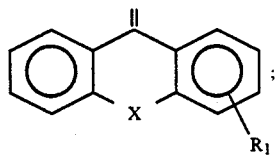;

and wherein in Formula (I) and (II): (1) A is hydrogen or an alkoxy group; (2) R is hydrogen or an alkyl group; (3) $R_1$ is hydrogen or an alkyl or alkoxy group; (4) Y is an O, S, N-H, N-alkyl, SO, $CH_2$ or $SO_2$ group; (5) X is an O, S, N-H, N-alkyl, SO, or $SO_2$ group; (6) B, $B_1$ and $B_2$ are hydrogen or an alkyl or alkoxy group; (7) C and D are hydrogen or together form a fused aromatic group; (8) R and A may be present more than once on the same or different benzene ring; (9) the B substituents are the same, and (10) $B_1$ and $B_2$ may be the same or different.

BRIEF DESCRIPTION OF THE DRAWINGS

The invention will be explained in greater detail by means of an exemplary embodiment and with reference to the accompanying drawings, in which FIGS. 1a–1b represent the structural formulae of cis- and transisomers of a bisphenanthrene, FIG. 2 represents the structural formula of a fluorene, FIG. 3 represents the structural formula of a (thio)xanthone, FIGS. 4, 5 and 6 represent the structural formulae of other compounds in accordance with the invention, and FIG. 7 diagrammatically shows a part of a cross-sectional view of an optical recording medium according to the invention.

DETAILED DESCRIPTION OF PREFERRED EMBODIMENTS

In FIG. 7, reference numeral 1 diagrammatically represents a part of a cross-sectional view of an optical recording medium. A quartz-glass carrier 3 having a thickness of 1.2 mm and a diameter of 12 cm is provided with a recording layer 5, having a thickness of 1 μm, by means of spin coating. For this purpose, a 10 wt. % solution of PMMA in chlorobenzene is prepared, in which also 4 wt. % of the compound shown in FIG. 1a is dissolved, in which compound X is $CH_2$ and R and A are hydrogen. The recording medium is ready after evaporation of the chlorobenzene. A laser-light source having a wavelength of 300 nm is used for writing the information, the recording frequency being 0.5 MHz and the linear velocity of the recording medium being 1.2 m/s. A cis-trans-isomerization takes place in the exposed areas, i.e. the compound having the structural formula shown in FIG. 1a is converted into that shown in FIG. 1b. The reading of the recorded information takes place with linearly polarized light having the same wavelength and having a low power. The plane of polarization in the exposed areas appears to have rotated through +0.1°. The recorded information is erased with light having a wavelength of 400 nm, which results in trans-cis isomerization, in said operation the plane of polarization rotates through −0.1°.

EXAMPLE 2

Starting from a racemic mixture of a compound shown in FIG. 2, where A, B, R=H and Y=O, an optical recording medium is manufactured as described in Example 1. The medium is inscribed with right-handed circularly polarized light with $\lambda=350$ nm. One of the enantiomers is enriched in the exposed areas, such that the information can be read with linearly polarized light of the same wavelength having a relatively low power of 0.1 mW. The plane of polarization in the exposed areas appears to have rotated through 0.1°. The recorded information is erased with linearly polarized light having a power of 10 mW, also at the same wavelength.

EXAMPLE 3

In accordance with Example 1, an optical recording medium is manufactured having a cis-compound in accordance with FIG. 4 as the chiral compound, where Y is $CH_2$; A, R, and $B_1$ are hydrogen and $B_2$ is $CH_3$. A squarylium dye in a quantity of 1 wt. % is also dissolved in the recording layer. Upon exposure to light with $\lambda=780$ nm, a racemic cis-mixture is formed in the exposed areas. Detection takes place with linearly polarized light of the same wavelength having a power of 0.1 mW.

We claim:

1. An optical recording medium comprising a carrier and a recording layer which contains at least one optically active organic compound in the form of an inherently chiral dissymmetric olefinic chromophore that comprises enantiomers which rotate the plane of polarization of polarized light and upon exposure to light can be converted at least partly from one form to another form.

2. An optical recording medium as claimed in claim 1, wherein the inherently dissymmetric olefinic chromophore is a compound having the formula

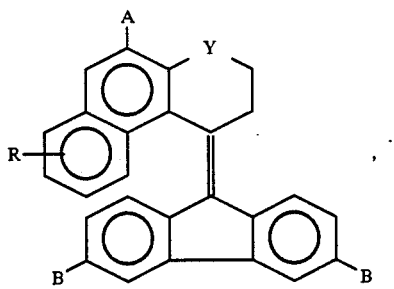

where Y represents a O-, S-, NH, N-alkyl, SO, $CH_2$ or $SO_2$-group, A represents hydrogen or an alkoxy group, R represents hydrogen or an alkyl group and B represents hydrogen, or an alkyl- or alkoxy group.

3. An optical recording medium as claimed in claim 1, wherein the inherently dissymmetric olefinic chromophore is a compound having the formula

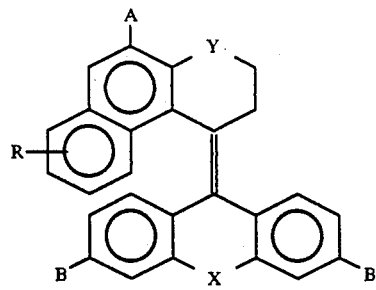

where X represents a O-, S-, NH, N-alkyl, SO or $SO_2$-group A represents hydrogen or an alkoxy group, R represents hydrogen or an alkyl group, Y represents a O-, S-, NH, N-alykl, SO, $CH_2$- or $SO_2$-group and B represents hydrogen or an alkyl or alkoxy group.

4. An optical recording medium as claimed in claim 1, wherein the inherently dissymmetric olefinic chromophore is selected from compounds having the following formulae:

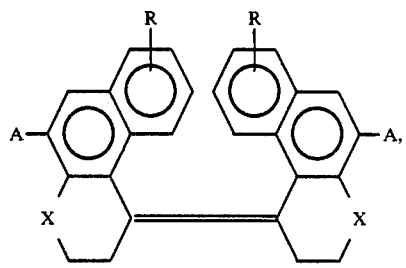

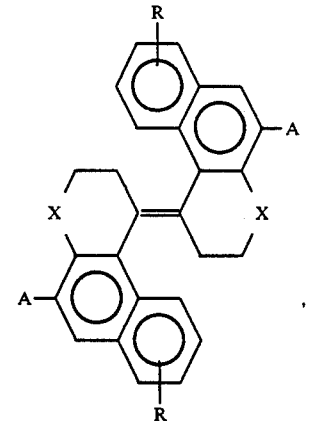

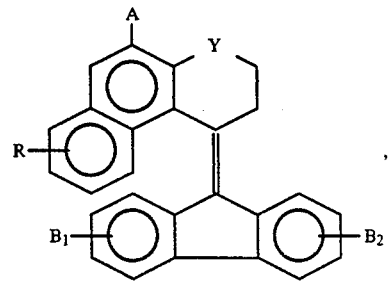

-continued

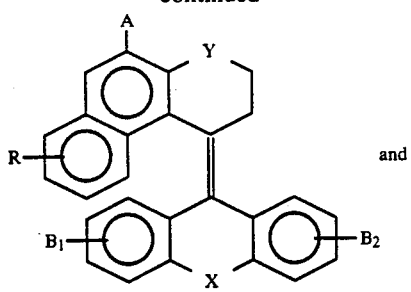

and

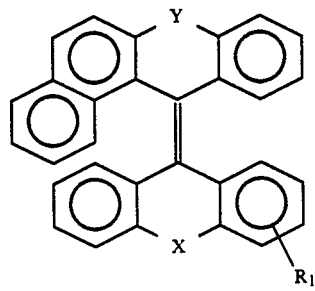

where X represents a -O, -S, -NH, N-alkyl, SO or -SO$_2$ group, A represents hydrogen or an alkoxy group, R represents hydrogen or an alkyl group, Y represents a O-, S-, -NH, N-alkyl, SO, SO$_2$ or -CH$_2$ group, R$_1$ represents hydrogen or an alkyl or alkoxy group, and B$_1$ and B$_2$ represents hydrogen or an alkyl- or alkoxy group, and -B$_1$ and B$_2$ are different.

5. An optical recording medium as claimed in claim 1 wherein the recording layer comprises a racemic mixture of the inherently dissymmetric chromophore.

6. An optical recording medium as claimed in claim 1 wherein the inherently dissymmetric olefinic chromophore is dissolved or dispersed in a polymer layer on the carrier.

7. An optical recording medium as claimed in claim 1 wherein the inherently dissymmetric olefinic chromophore is covalently bonded to a polymer chain of a polymer layer on the carrier.

8. An optical recording medium comprising a carrier and a recording layer which contains at least one optically active organic compound inherently dissymmetric olefinic chromophore selected from compounds having the formula

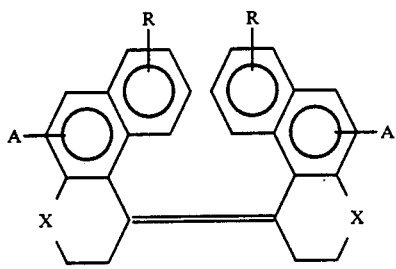

or inherently dissymmetric olefinic chromophores selected from the group of compounds having the formula:

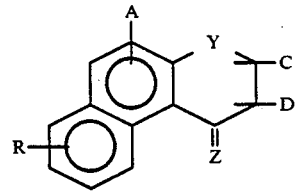

wherein:
Z is selected from

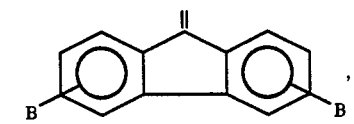

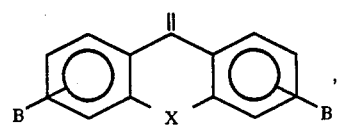

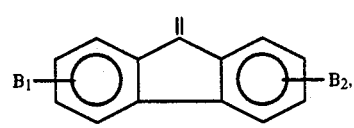

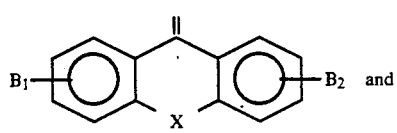

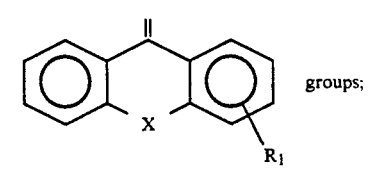

groups;

and wherein which in Formula (I) and (II):
(1) A is hydrogen or an alkoxy group; (2) R is hydrogen or an alkyl group; (3) R$_1$ is hydrogen or an alkyl or alkoxy group; (4) Y is an O, S, N-H, N-alkyl, SO, CH$_2$ or SO$_2$ group; (5) X is an O, S, N-H, N-alkyl, SO, or SO$_2$ group; (6) B, B$_1$ and B$_2$ are hydrogen or an alkyl or alkoxy group; (7) C and D are hydrogen or together form a fused aromatic group; (8) R and A may be present more than once on the same or different benzene ring; (9) The B substituents are the same; and (10) B$_1$ and B$_2$ may be the same or different.

9. An optical recording medium as claimed in claim 8 wherein the recording layer comprises a racemic mixture of the inherently dissymmetric chromophore.

10. An optical recording medium as claimed in claim 8 wherein the inherently dissymmetric olefinic chromophore is dissolved or dispersed in a polymer layer on the carrier.

11. An optical recording medium as claimed in claim 8 wherein the inherently dissymmetric olefinic chromophore is covalently bonded to a polymer chain of a polymer layer on the carrier.

* * * * *